(12) United States Patent
Shalev

(10) Patent No.: US 11,836,330 B1
(45) Date of Patent: Dec. 5, 2023

(54) SOLFEGGIO FREQUENCIES MEDIA APPLICATION

(71) Applicant: Yoav Shalev, Brownsboro, TX (US)

(72) Inventor: Yoav Shalev, Brownsboro, TX (US)

( * ) Notice: Subject to any disclaimer, the term of this patent is extended or adjusted under 35 U.S.C. 154(b) by 0 days.

(21) Appl. No.: 17/866,078

(22) Filed: Jul. 15, 2022

(51) Int. Cl.
G06F 3/0482 (2013.01)
G10H 1/02 (2006.01)

(52) U.S. Cl.
CPC ............. *G06F 3/0482* (2013.01); *G10H 1/02* (2013.01)

(58) Field of Classification Search
CPC .................................................. G06F 3/048–05
See application file for complete search history.

(56) References Cited

U.S. PATENT DOCUMENTS

| 6,740,802 | B1 * | 5/2004 | Browne, Jr. | G10H 1/0025 84/622 |
| 2010/0024626 | A1 * | 2/2010 | Howarth | G10G 1/04 84/483.2 |
| 2011/0289410 | A1 * | 11/2011 | Paczkowski | G11B 27/034 379/202.01 |

OTHER PUBLICATIONS

432hzconverter.com, "432 Hertz Music Converter", archived in the wayback machine ( <<https://web.archive.org/>>) on Nov. 6, 2019, available at <<https://www.432hzconverter.com/>>, 4 pages (Year: 2019).* cycling74.com, "convert streaming music (e.g. Tidal) from 440 hz to 432 hz", posted Feb. 23, 2015, available at <<https://cycling74.com/forums/convert-streaming-music-e-g-tidal-from-440-hz-to-432-hz>>, 6 pages (Year: 2015).*

\* cited by examiner

*Primary Examiner* — Daniel Rodriguez
(74) *Attorney, Agent, or Firm* — Cygnet IP Law; Stephen W. Aycock, II

(57) ABSTRACT

Solfeggio Frequencies media application methods, systems and computer readable media are described.

13 Claims, 5 Drawing Sheets

200

SOLFEGGIO FREQUENCIES MEDIA APPLICATION

TECHNICAL FIELD

Embodiments relate generally to digital media applications, and more particularly, to methods, systems and computer readable media for a Solfeggio Frequencies media application.

BACKGROUND

Solfeggio Frequencies are certain frequencies of sound that have been associated with one or more potential benefits to a listener. Most western music is built around a scale that centers on an A4 note having a frequency of 440 Hz. A need may exist for a media application that can playback music or other sound that has been programmatically processed to be recentered around an A having one of the Solfeggio Frequencies or another frequency, such as A4 being 432 Hz in order to provide a listener with the potential benefits of an Earth tone with calming traits.

Some implementations were conceived in light of the above-mentioned needs, problems and/or limitations, among other things. The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method. The method can include importing one or more media files from a media source, causing information about the one or more media files to be displayed, and receiving a selection of a selected one of the one or more media files. The method can also include causing a Solfeggio Frequency graphical user interface control to be displayed, when the Solfeggio Frequency graphical user interface control is selected, causing a list of one or more Solfeggio Frequencies to be displayed, and receiving a selection of a Solfeggio Frequency from the displayed list of one or more Solfeggio Frequencies.

The method can further include causing a media playback control to be displayed, when the media playback control is selected, playing the selected one of the one or more media files, and prior to the selected one of the one or more media files being output, transforming the sound output from being based on a first reference frequency to a modified sound that is based on selected Solfeggio Frequency, wherein the transforming is based on the first reference frequency and the selected Solfeggio Frequency.

In some implementations, the media source includes media files stored on a user device. In some implementations, the media source includes media files received at a user device from an external streaming service.

In some implementations, information about the one or more media files includes the respective titles of the one or more media files. In some implementations, the list of one or more Solfeggio Frequencies includes one or more of 174 Hz, 285 Hz, 396 Hz, 417 Hz, 432 Hz, 440 Hz, 528 Hz, 639 Hz, 741 Hz, and 852 Hz. It will be appreciated that other Solfeggio frequencies could be discovered later or other frequencies with beneficial effects could be discovered, and an implementation can be configured to utilize the newly discovered frequencies.

DETAILED DESCRIPTION

Figure 1:
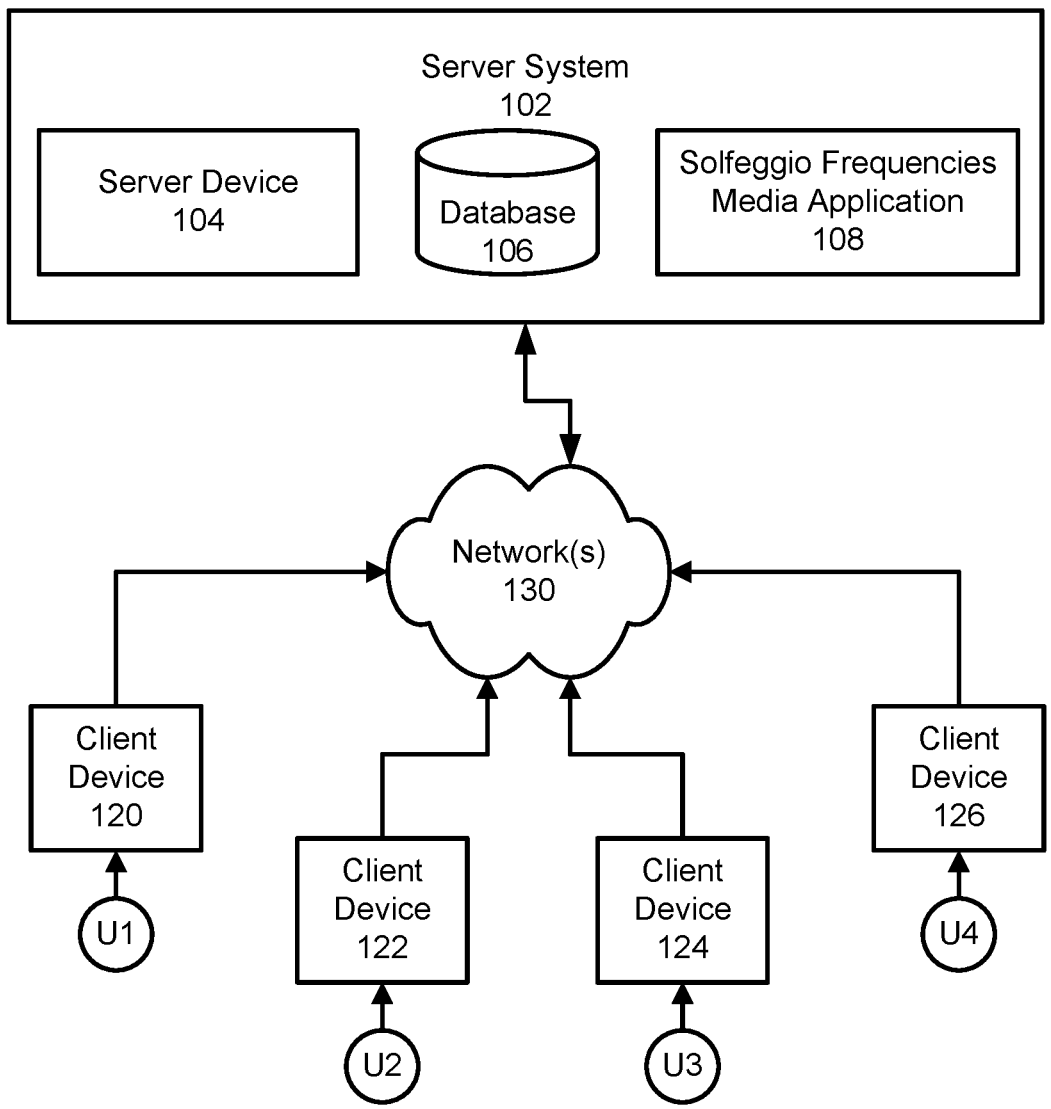
FIG. 1 shows a computing environment configured for a Solfeggio Frequency media application in accordance with some implementations.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and Solfeggio Frequencies media application 108. FIG. 1 also shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), earphones, headphones, wristwatch, headset, armband, jewelry, etc.), virtual reality (VR) and/or augmented reality (AR) enabled devices, personal digital assistant (PDA), media player, smart speaker, game device, a vehicle computer system, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide Solfeggio Frequency media application functions as described herein.

Various implementations of features described herein can use any type of system and/or service. Any type of electronic device can make use of features described herein. Some implementations can provide one or more features described herein on client or server devices disconnected from or intermittently connected to computer networks.

Figure 2:
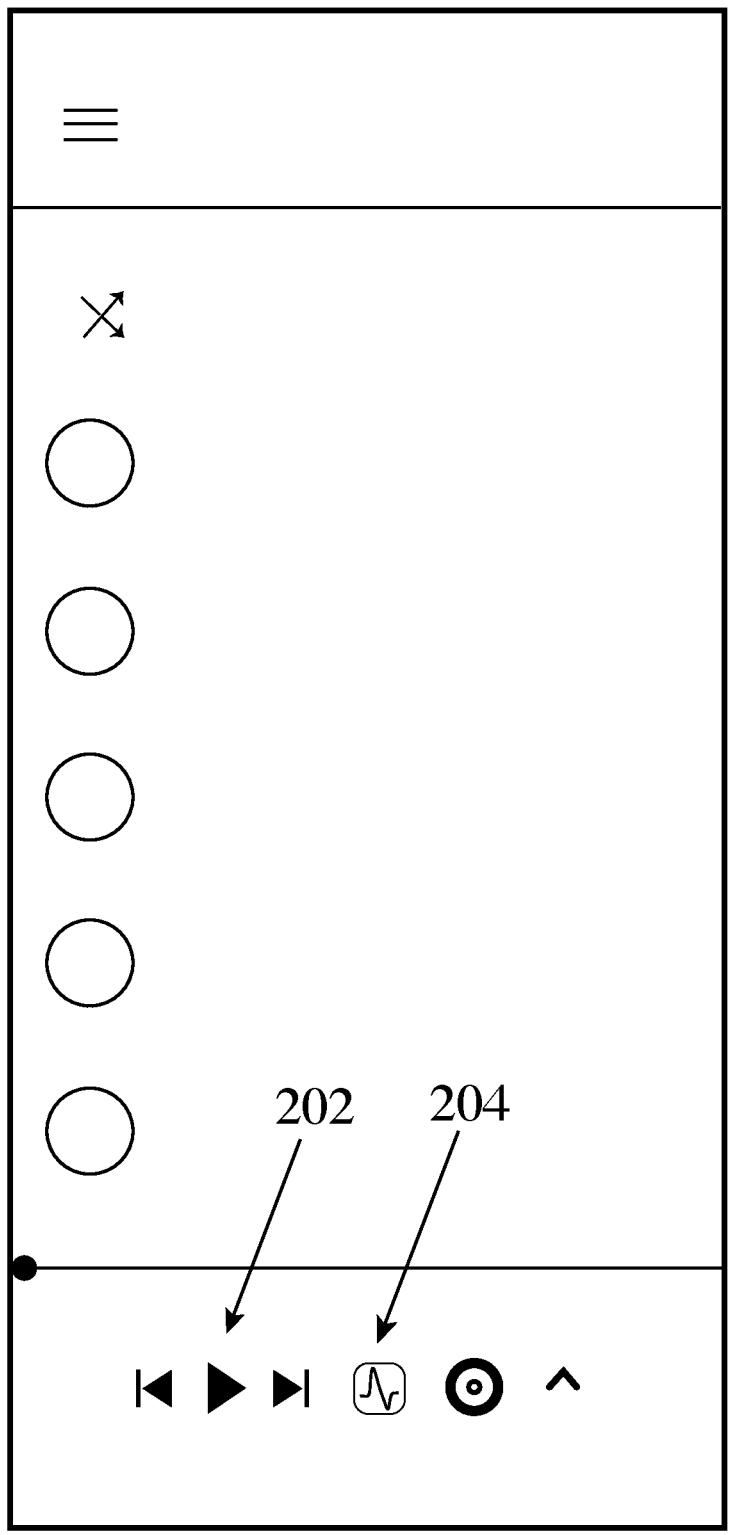
FIG. 2 is a diagram of a first example user interface of a Solfeggio Frequencies media application in accordance with some implementations.

FIG. 2 is a diagram of a first example user interface of a Solfeggio Frequencies media application in accordance with some implementations. In particular, FIG. 2 shows a Solfeggio Frequencies media application user interface 200 that includes a media playback control 202 and a Solfeggio Frequencies control 204.

Figure 3:
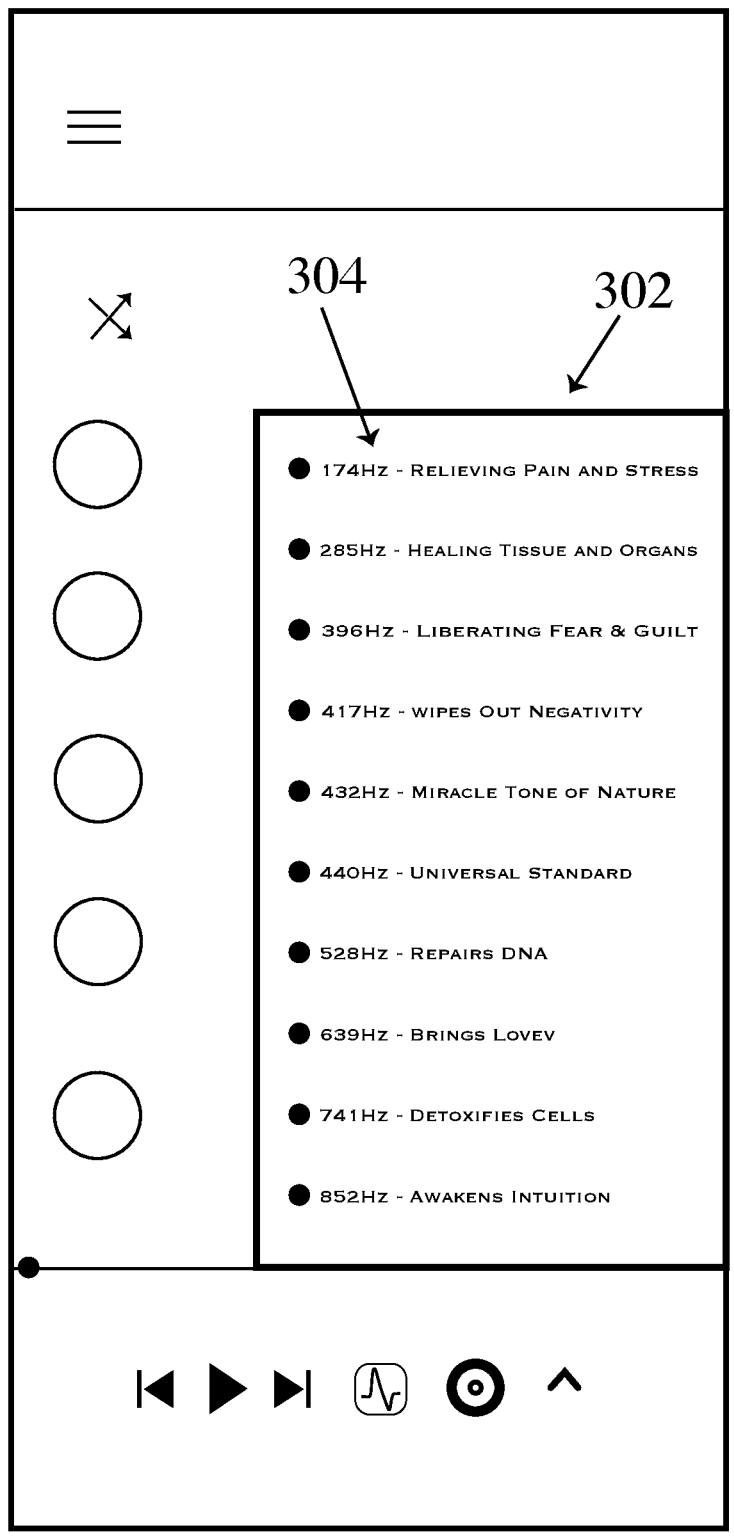
FIG. 3 is a diagram of a second example user interface of a Solfeggio Frequencies media application in accordance with some implementations.

FIG. 3 is a diagram of a second example user interface 300 of a Solfeggio Frequencies media application in accordance with some implementations. In particular, when the Solfeggio Frequencies control 204 shown in FIG. 2 is selected by a user, a Solfeggio Frequencies selection control 302 is caused to be displayed. The Solfeggio Frequencies selection control 302 includes one or more Solfeggio Frequencies 304 that can be selected by a user to control the transformation of the audio from a media file from a first central frequency (e.g., A4=440 Hz) to a second central frequency (e.g., A=432 Hz). In the example shown in FIG. 3, the Solfeggio Frequencies selection control 302 includes 174 Hz (believed to be associated with relieving pain and stress), 285 Hz (believed to be associated with healing tissue and organs), 396 Hz (believed to be associated with liberating fear and guilt), 417 Hz (believed to be associated with wiping out negativity), 432 Hz (believed to be associated with a miracle tone of nature), 440 Hz (universal standard frequency in western music), 528 Hz (believed to be associated with repairing DNA), 639 Hz (believed to be associated with bringing love), 741 Hz (believed to be associated with detoxifying cells), and 852 Hz (believed to be associated with awakening intuition).

Figure 4:
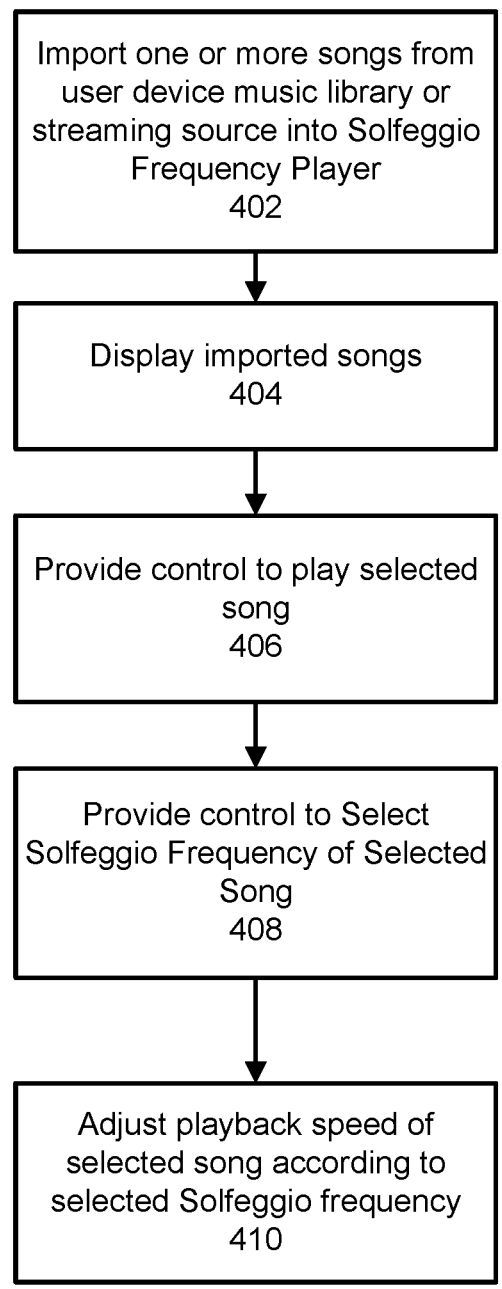
FIG. 4 is a flowchart of an example Solfeggio Frequencies media application computer implemented method in accordance with some implementations.

FIG. 4 is a flowchart of an example Solfeggio Frequencies media application computer implemented method in accordance with some implementations. Processing begins at 402, where one or more electronic or digital songs (or other electronic or digital media files) are imported or accessed. For example, the one or more media files can be accessed from a memory in a user device, or the one or more media files can be received from a streaming service at the user device. In general, any source of media files (e.g., audio, music, video with sound, etc.) can be used and accessed or imported to the Solfeggio Frequencies media application. Processing continues to 404.

At 404, information about the one or more media files is displayed. For example, the titles of one or more songs are displayed. Processing continues to 406.

At 406 a control is provided to playback a selected one of the one or more media files. For example, if a user selects the control 202 shown in FIG. 2, a selected media file will be played. In addition to or as an alternative to a graphical user interface, voice control can be used to select one of the media files to play. Processing continues to 408.

At 408, a control to select a Solfeggio Frequency is provided. For example, if a user selects the control 204 as shown in FIG. 2, a list of available Solfeggio Frequencies is displayed (see, e.g., FIG. 3). A user can then select from among the available Solfeggio Frequencies. In addition to or as an alternative to a graphical user interface, voice control can be used to select a Solfeggio Frequency or other frequency. Processing continues to 410.

At 410, the selected media file sound output is transformed by the Solfeggio Frequencies media application by shifting from a first central frequency (e.g., A4=440 Hz) to the selected Solfeggio Frequency, where the transformation of the audio is performed before the sound is output and without modifying the media file being played. The transformation can be performed by computing a ratio of an adjusted A4 frequency (in the A4 Hz value column in Table 1 below) that will yield a selected Solfeggio Frequency (in at least one note of the musical scale) to the standard frequency (e.g., 440 Hz) and then using the computed ratio to adjust the frequency of the media file sound output (e.g., by controlling the rate of playback) prior to it being sent to a sound output device. For example, if a Solfeggio frequency of 396 Hz is desired, the A4 tuning can be set to 444.5 Hz, which will result in the G4 note being 396 Hz, as described in https://propheticguitar.com/solfeggio/, which is incorporated herein by reference in its entirety. By computing the rate adjustment factor, an implementation of the disclosed subject matter can achieve the Solfeggio frequencies (or other desired frequencies) without having to modify the music itself or record new music with specially tuned instruments, by adjusting the output rate according to the calculated rate adjustment parameter. Thus, a user without specialized musical knowledge can adapt his or her music to desired frequencies via an improved media player user interface and method.

Table 1, below, shows an example relationship between Solfeggio frequencies, A4 frequencies, and a rate adjustment factor for rate of sound output playback.

TABLE 1

| Solfeggio Frequency HZ | A4 Hz value | Set Rate |
| --- | --- | --- |
| 174 | 438.48 | 0.9965454545 |
| 285 | 452.37 | 1.028113636 |
| 396 | 444.5 | 1.010227273 |
| 417 | 441.8 | 1.004090909 |
| 432 | 432 | 0.9818181818 |
| 440 | 440 | 1 |
| 528 | 444 | 1.009090909 |
| 639 | 452 | 1.027272727 |
| 741 | 416 | 0.9454545455 |
| 852 | 426 | 0.9681818182 |
| 963 | 429 | 0.975 |

Figure 5:
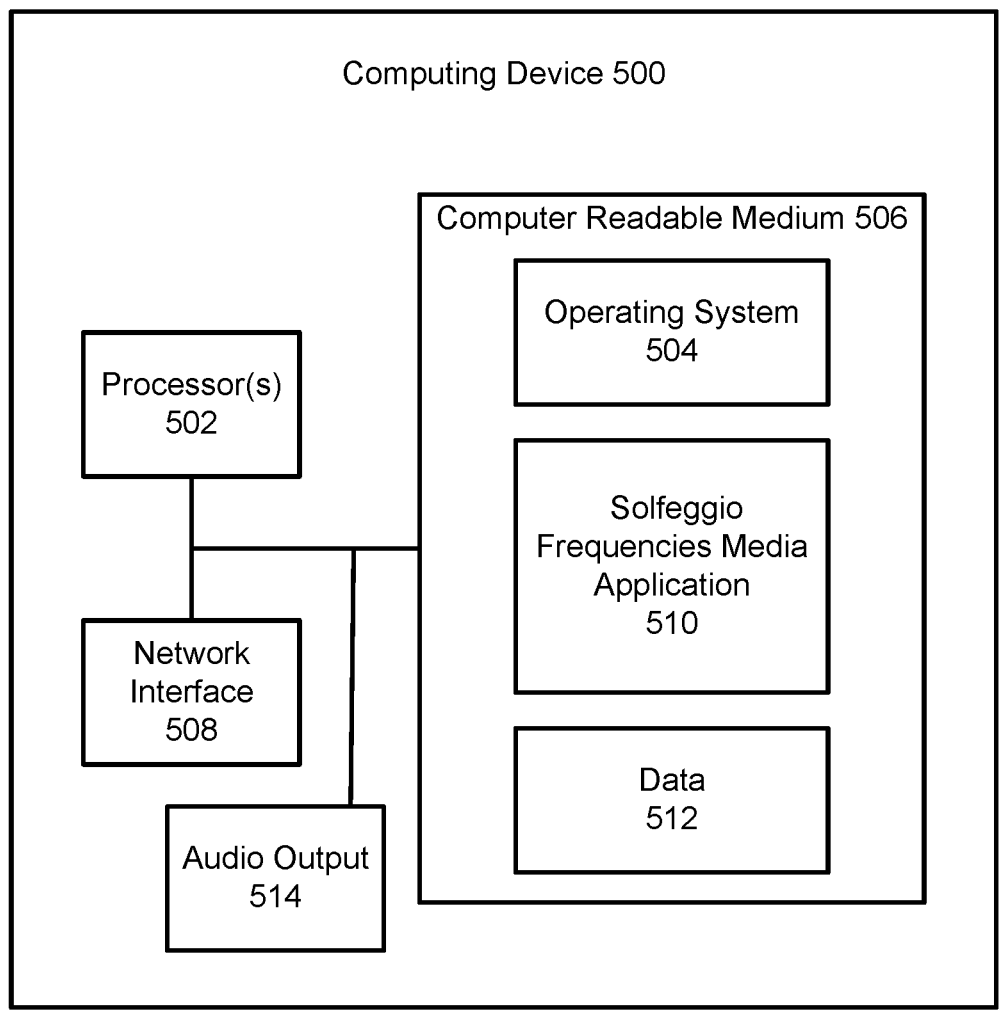
FIG. 5 is a diagram of an example computing device configured for Solfeggio Frequencies media application in accordance with at least one implementation.

FIG. 5 is a diagram of an example computing device 500 in accordance with at least one implementation. The computing device 500 includes one or more processors 502, nontransitory computer readable medium 506 and network interface 508. The computer readable medium 506 can include an operating system 504, an application 510 for Solfeggio Frequencies media functions and a data section 512 (e.g., for storing Solfeggio Frequency conversion data, user preferences or profiles for Solfeggio Frequencies media functions, etc.).

In operation, the processor 502 may execute the application 510 stored in the computer readable medium 506. The application 510 can include software instructions that, when executed by the processor, cause the processor to perform operations to provide Solfeggio Frequencies media functions in accordance with the present disclosure (e.g., performing associated functions described above and shown in FIG. 4).

The application program 510 can operate in conjunction with the data section 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media to provide Solfeggio Frequencies media.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method comprising:
   accessing, from an application program executing on a user device, a media file from a streaming service;
   causing a media playback control to be displayed on a display of the user device;
   when the media playback control is selected, playing the media file via the application program;
   causing a Solfeggio Frequency graphical user interface control to be displayed;
   when the Solfeggio Frequency graphical user interface control is selected, causing a list of one or more Solfeggio Frequencies to be displayed;
   receiving a selection of a Solfeggio Frequency from the displayed list of one or more Solfeggio Frequencies, wherein a selection of a Solfeggio Frequency can occur during playing of the media file; and
   transforming, as the media file is playing, a sound output of the media file from being based on a first reference frequency to a modified sound output that is based on the selected Solfeggio Frequency, wherein the transforming is based on the first reference frequency and the selected Solfeggio Frequency, and wherein the transforming is performed without modifying the media file accessed from the streaming service.

2. The computer-implemented method of claim 1, further comprising displaying information about the media file including a title.

3. The computer-implemented method of claim 1, wherein the list of one or more Solfeggio Frequencies includes one or more of 174 Hz, 285 Hz, 396 Hz, 417 Hz, 432 Hz, 440 Hz, 528 Hz, 639 Hz, 741 Hz, 852 Hz, or 963 Hz.

4. A computer-implemented method comprising:
   accessing, from an application program executing on a user device, a media file from a streaming service;
   presenting, from the application program on a display of the user device, a media playback control;
   when the media playback control is selected, playing the selected one of the one or more media files via the application program;
   presenting, from the application program on the display of the user device, a Solfeggio Frequency user interface control;
   when the Solfeggio Frequency user interface control is selected, causing a list of one or more Solfeggio Frequencies to be displayed within the application program on the display of the user device;
   receiving, at the application program, a selection of a Solfeggio Frequency from the presented list of one or more Solfeggio Frequencies, wherein a selection of a Solfeggio Frequency can occur prior to playback of the selected one of the one or more media files, or during playback of the selected one of the one or more media files;
   transforming, as the media file is playing, a sound output of the media file from being based on a first reference frequency to a modified sound that is based on the selected Solfeggio Frequency, wherein the transforming is based on the first reference frequency and the selected Solfeggio Frequency, and wherein the transforming is performed within the application program.

5. The computer-implemented method of claim 4, further comprising displaying, by the application program on the display of the user device information about the media file including a title of the media file.

6. The computer-implemented method of claim 4, wherein the list of one or more Solfeggio Frequencies includes one or more of 174 Hz, 285 Hz, 396 Hz, 417 Hz, 432 Hz, 440 Hz, 528 Hz, 639 Hz, 741 Hz, 852 Hz, or 963 Hz.

7. A computer-implemented method comprising:
   receiving one or more media files from a media source, wherein the one or more media files are one of stored files or streamed files;
   causing information about the one or more media files to be presented;
   receiving a selection of a selected one of the one or more media files;
   presenting a media playback control;
   when the media playback control is selected, playing the selected one of the one or more media files;
   presenting a Solfeggio Frequency user interface control;
   when the Solfeggio Frequency user interface control is selected, causing a list of one or more Solfeggio Frequencies to be displayed;
   receiving a selection of a Solfeggio Frequency from the presented list of one or more Solfeggio Frequencies;
   transforming a sound output of the selected one of the one or more media files from being based on a first reference frequency to a modified sound that is based on the selected Solfeggio Frequency, wherein the transforming is performed by adjusting the first reference frequency of the selected one of the one or more media files using a ratio of an adjusted frequency corresponding to the selected Solfeggio Frequency and the first reference frequency, and wherein the transforming is performed without modifying the selected one of the one or more media files,
   wherein the transforming is performed by adjusting the first reference frequency of the selected one of the one or more media files using a ratio of an adjusted frequency corresponding to the selected Solfeggio Frequency and the first reference frequency, and wherein the transforming is performed without modifying the selected one of the one or more media files,
   wherein the adjusting of the first reference frequency is performed by controlling a rate of playback of the selected one of the one or more media files prior to the selected one of the one or more media files being output, and wherein the adjusted frequency corresponds to the selected Solfeggio Frequency in one or more musical scales.

8. The computer-implemented method of claim 7, wherein the adjusting of the first reference frequency is performed by controlling a rate of playback of the selected one of the one or more media files prior to the selected one of the one or more media files being output.

9. The computer-implemented method of claim 7, wherein the adjusted frequency corresponds to the selected Solfeggio Frequency in one or more musical scales.

10. The computer-implemented method of claim 7, wherein the media source includes media files received at a user device from an external streaming service.

11. The computer-implemented method of claim 7, wherein the list of one or more Solfeggio Frequencies includes one or more of 174 Hz, 285 Hz, 396 Hz, 417 Hz, 432 Hz, 440 Hz, 528 Hz, 639 Hz, 741 Hz. 852 Hz, or 963 Hz.

12. The computer-implemented method of claim 7, wherein the media source includes media files stored on a user device.

13. The computer-implemented method of claim 7, wherein the information about the one or more media files includes respective titles of the one or more media files.

\* \* \* \* \*